(12) United States Patent
Hayakawa

(10) Patent No.: US 6,302,586 B1
(45) Date of Patent: Oct. 16, 2001

(54) FLUID SEALING DEVICE FOR USE WITH A MOTOR FOR ROTATING A DISC DRIVE

(75) Inventor: Masamichi Hayakawa, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 0 days.

(21) Appl. No.: 09/271,734

(22) Filed: Mar. 18, 1999

Related U.S. Application Data

(63) Continuation of application No. 08/783,611, filed on Jan. 14, 1997, now abandoned.

(51) Int. Cl.[7] ........................................................ F16C 33/74
(52) U.S. Cl. ................................................................ 384/119
(58) Field of Search ................................... 384/119, 124, 384/133, 132, 130, 488

(56) References Cited

U.S. PATENT DOCUMENTS

| | | |
|---|---|---|
| 4,915,510 | 4/1990 | Arvidsson . |
| 5,284,391 | 2/1994 | Diel . |
| 5,323,972 | 6/1994 | Kjellqvist . |
| 5,328,271 | 7/1994 | Titcomb . |
| 5,577,842 | 11/1996 | Parsoneault . |

FOREIGN PATENT DOCUMENTS

| | | |
|---|---|---|
| 7310830 | 11/1995 | (JP) . |
| 814403 | 1/1996 | (JP) . |
| 861517 | 3/1996 | (JP) . |
| 872189 | 3/1996 | (JP) . |
| 874864 | 3/1996 | (JP) . |

Primary Examiner—Lenard A. Footland
(74) Attorney, Agent, or Firm—Reed Smith LLP

(57) ABSTRACT

A fluid sealing device for use in a motor having a fluid bearing for mounting a frame to a shaft. The fluid sealing device includes a bearing fluid reservoir, a sealing plate, and a bearing fluid absorbing pad. The bearing fluid reservoir is positioned at one axial end of the fluid bearing. The sealing plate is mounted on the frame and positioned axially outward of the bearing fluid reservoir. The sealing plate has an inner edge extending radially toward the shaft to provide a sealing space between the shaft and the sealing plate. A bearing fluid absorbing pad is mounted axially inward from the sealing plate. A capture space is provided between the bearing fluid absorbing pad, sealing plate and reservoir such that the bearing fluid absorbing pad is exposed to the reservoir.

10 Claims, 5 Drawing Sheets

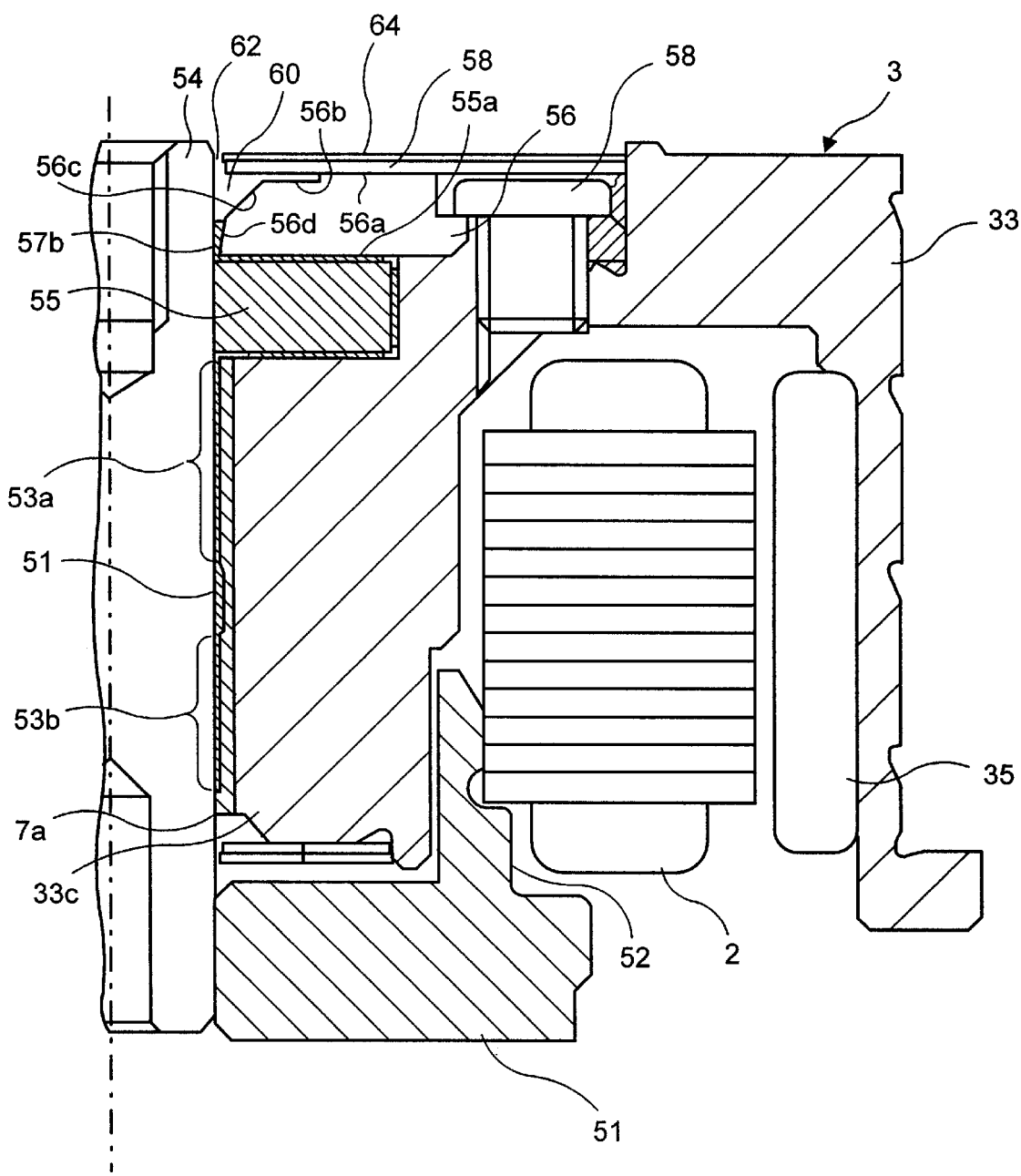
F I G. 5

FLUID SEALING DEVICE FOR USE WITH A MOTOR FOR ROTATING A DISC DRIVE

This application is a continuation of application Ser. No. 08/783,611, filed Jan. 14, 1997, abandoned.

BACKGROUND OF THE INVENTION

A) Field of Invention

The present invention relates to a fluid sealing device for use with a motor, and more particularly to a fluid sealing device for use with a motor for rotating a disc drive.

B) Description of Related Art

Numerous fluid sealing devices for use with motors for rotating disc drives have been proposed. For example, various embodiments of known fluid sealing devices are shown in abandoned U.S. patent application Ser. No. 08/438,953, which was filed on May 11, 1995, and U.S. patent application Ser. No. 08/442,32 which was filed on May 16, 1995, U.S. Pat. No. 5,675,199.

FIG. 1 of the current application shows a DC motor which uses a known fluid sealing device as described in the '953 application. The motor includes a frame 21 with a center shaft 21a. In this motor, a hub 54 is mounted on the center shaft 21a of the frame 21 by use of bearings 2 and a magnetic bearing fluid 14.

A stator core 6 is fixed to an outer surface of the frame 21 and a coil 5 is wound onto the stator core 6. A drive magnet 7 is attached to an inner periphery of the hub 54 and is positioned to face the stator core 6. One or more discs, which are not shown, are loaded onto the outer periphery of the hub 54. Thus, when a voltage is applied to the coil 5 from an external power source, the hub 54 and associated discs are rotated.

The frame 21 and center shaft 21a are made of a ferromagnetic material. A magnet 30 having an inclined surface 30A is positioned near an open end of the frame 21 to form a magnetic circuit. The magnetic circuit includes the magnet 30, ferromagnetic frame 21 and center shaft 21a, as well as the magnetic bearing fluid 14. This magnetic circuit prevents the magnetic bearing fluid 14 from leaking out of the motor and contaminating the discs.

The DC motor shown in FIG. 1 also includes bearing fluid absorption members 43 which are attached to an upper surface of the magnet 30 and an outer surface of the shaft 21a. Thus, even if the magnetic bearing fluid 14 is not completely contained by a magnetic flux produced from the magnetic circuit, the bearing fluid absorption members 43 will absorb the magnetic fluid and prevent further leakage.

FIG. 2, which is also included in the '953 application, shows a similar fluid sealing device. Under this arrangement, a magnet 31 and ferromagnetic body 35, which is fixed to a center shaft 3, form part of a magnetic circuit to prevent the magnetic bearing fluid 14 from leaking out of the motor and contaminating the discs.

The DC motor shown in FIG. 2 also uses bearing fluid absorption members 43. The bearing fluid absorption members 43 of the device shown in FIG. 2 are also attached to an upper end of a magnet 31 and an outer peripheral surface of a shaft 3. Similar to the device shown in FIG. 1, the bearing fluid absorption members 43 are provided to absorb magnetic bearing fluid which escapes a magnetic flux produced by the magnetic circuit.

FIG. 3, which is described in the '321 application, shows another known configuration of a fluid sealing device for a DC motor. Referring to FIG. 3, a magnet 30, center shaft 3, and bearing 2 form part of a magnetic circuit to prevent the magnetic bearing fluid 14 from leaking from a motor.

A plate 41 is mounted to one end of the magnet 30 adjacent to an open end of the shaft 3 to further prevent the magnetic bearing fluid 14 from leaking. Attached to the plate 41 and the shaft 3 are layers 42 which are made of a slippery material such as TEFLON. The layers 42 cause the magnetic bearing fluid 14 coming into contact with them to form into beads or droplets and thus be returned to the reservoir of magnetic bearing fluid 14.

Bearing fluid absorption members 43 are also provided and positioned on an upper surface of the plate 41 and on the center shaft 3. The bearing fluid absorption members 43 absorb any magnetic bearing fluid 14 which leaks past the magnetic circuit and the layers 42.

During conditions of shock and vibration, the bearing fluid escapes from its reservoir. The devices shown in FIGS. 1 through 3 capture much of the escaped bearing fluid. However, any bearing fluid that is not captured by these devices tends to contaminate the discs affixed to the motor. Thus, there remains a need for an improved bearing fluid sealing device which can more effectively capture and absorb larger amounts of bearing fluid and therefore more effectively prevent bearing fluid from leaking and from contaminating the discs.

OBJECTS OF THE INVENTION

An object of the invention is to provide a bearing fluid sealing device which can more effectively capture and absorb bearing fluid to better prevent bearing fluid from leaking from a motor and contaminating disks.

A further object of the invention is to provide a fluid sealing device with a design that can accommodate known and proven motor structures.

Another object of the invention to provide a fluid sealing device that is low in cost, reliable in use, and which does not compromise or degrade the performance characteristics of the motor.

BRIEF DESCRIPTION

In one embodiment of the invention, a sealing device for bearing fluid in a motor involves an arrangement of a sealing plate and bearing fluid absorption pad mounted axially outward from a reservoir for the bearing fluid. A radially expanded capture space between the reservoir and the combination of plate and pad assures that droplets of bearing fluid impinge on a surface of the bearing fluid absorption pad.

An end surface of the bearing fluid absorption pad is exposed to the capture space above the bearing fluid reservoir. Thus, when bearing fluid leaks, a large surface area of the bearing fluid absorption pad is available to capture and absorb the bearing fluid.

BRIEF DESCRIPTION OF THE DRAWINGS

FIG. 5 is a cross sectional view of portion of a motor showing a second embodiment of a fluid sealing device in accordance with the present invention; and, FIG. 6 is a cross sectional view of a portion of a motor showing a third embodiment of a bearing fluid sealing device in accordance with the present invention.

DETAILED DESCRIPTION OF THE INVENTION

Figure 1:
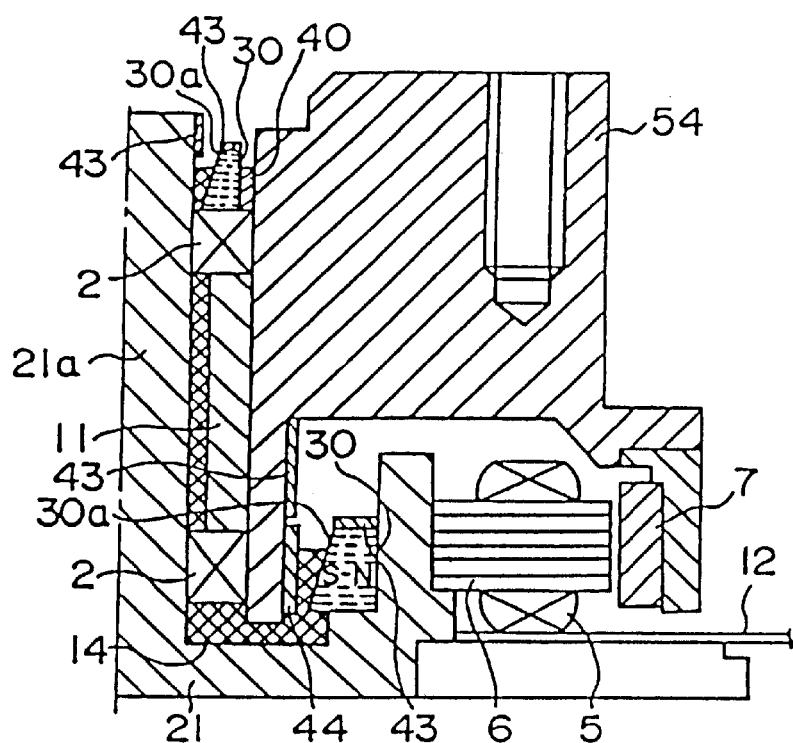
FIG. 1 is a cross sectional view of a portion of a motor showing a known fluid sealing device.
Figure 2:
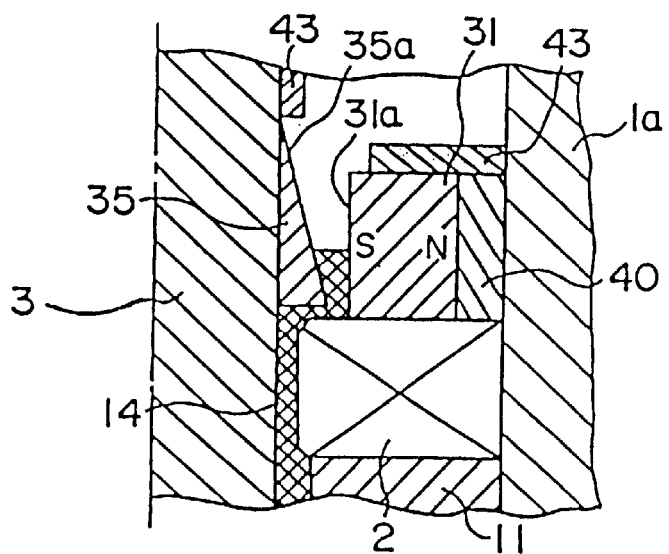
FIG. 2 is a cross sectional view of a portion of a motor showing another known fluid sealing device.
Figure 3:
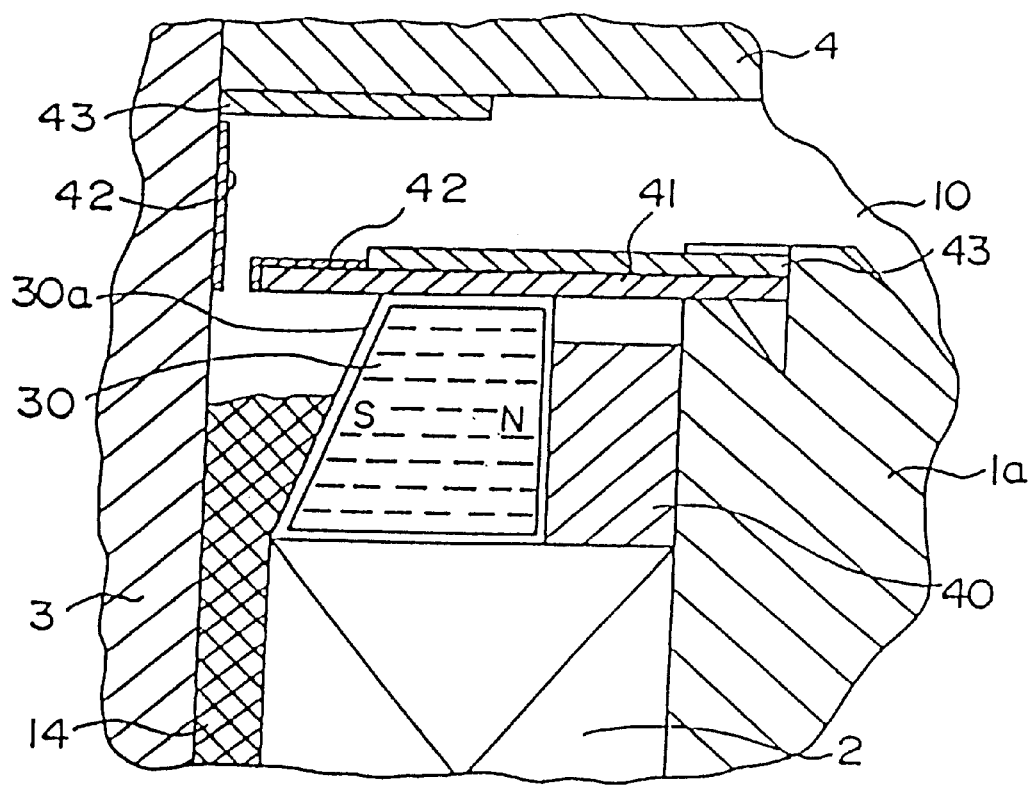
FIG. 3 is a cross sectional view of a portion of a motor showing yet another known fluid sealing device.
Figure 4:
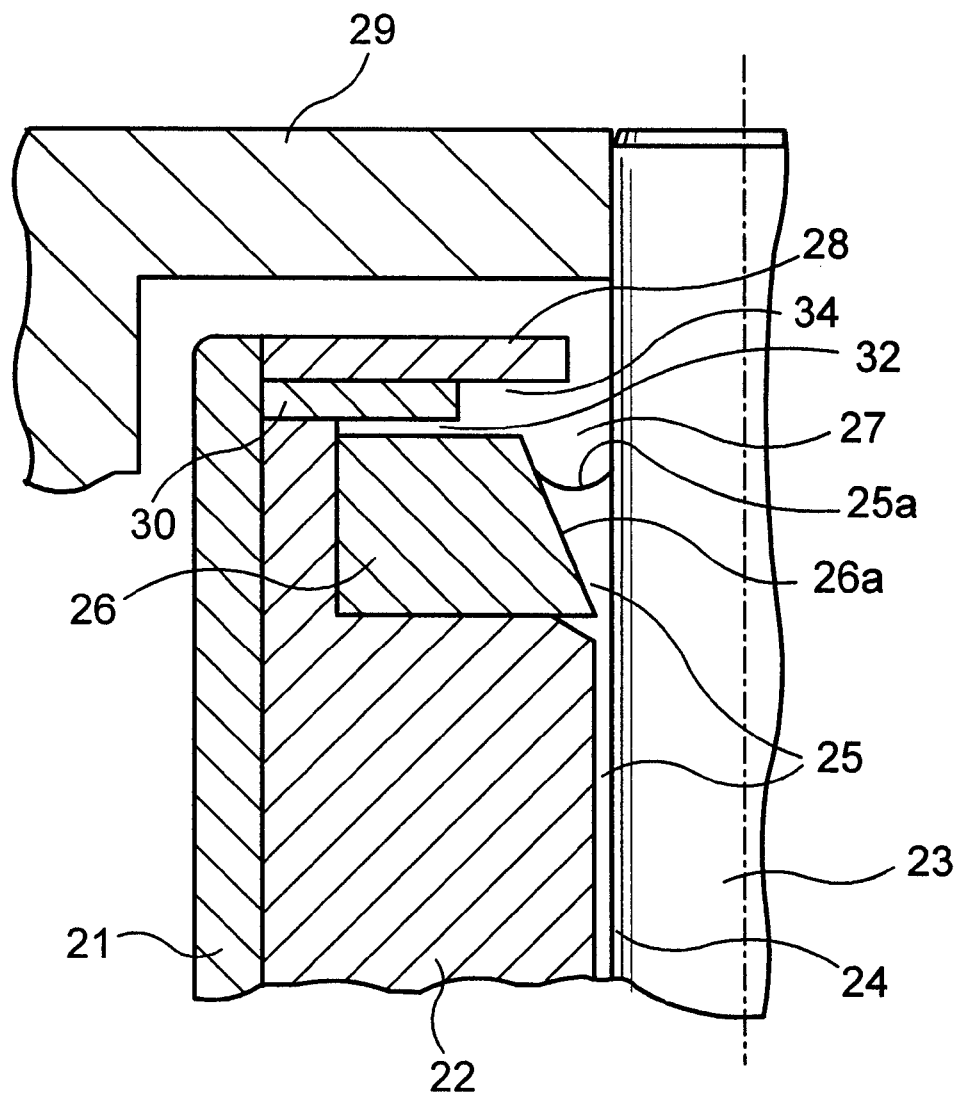
FIG. 4 is a cross sectional view of a portion of a motor showing a first embodiment of a fluid sealing device in accordance with the present invention.

FIG. 4 is cross sectional view of a fluid sealing device in a DC motor according to a first embodiment of the invention. The motor shown in FIG. 4 is a spindle motor which includes a shaft 23, a frame 21, a bearing fluid bearing plate 22, and a magnetic bearing fluid 25 as a bearing fluid. The shaft 23 spins within the fluid bearing plate 22 to rotate a hub 29 which is fixed to the shaft 23. A plurality of discs, which are not shown, are attached to an outer surface of the hub 29.

A magnet 26 as a plate having an inclined surface is positioned on a ledge formed in an upper surface of the bearing plate 22. The magnet 26 includes an inclined surface 26a which faces the shaft 23. A reservoir 27 is formed between the inclined surface 26a of the magnet 26 and the shaft 23 to store the magnetic bearing fluid 25. Note that this embodiment is that bearing plate 22, shaft 23, and magnet 26 form part of a magnetic circuit to more effectively prevent the magnetic bearing fluid 25 from leaking from the motor.

A bearing fluid absorption pad 30, which is an annular disc, is mounted on an axially outward surface of the bearing plate 22 and is positioned axially outward from the magnet 26. A capture space 32 is thus formed between an axially outward surface of the magnet 26 and an axially inward lateral surface of the bearing fluid absorption pad 30 which exposes a substantial portion of the inward lateral surface of the bearing absorption pad 30 to the reservoir 27.

A sealing plate 28, which is also an annular disc, is mounted to the frame 21 and positioned axially outward from the bearing fluid absorption pad 30. The sealing plate 28 extends beyond the bearing fluid absorptions pad 30 in a radially inward direction toward the shaft 23 such that a capture space 34 is formed beneath the sealing plate 28 and between an end surface of the bearing fluid absorption pad 30 and the shaft 23. The capture space 34 places the end surface of the bearing absorption pad 30 in close proximity to the reservoir 27.

The first embodiment of the invention described above exposes both a lateral and end surface of the bearing fluid absorption pad 30 to the reservoir 27 which contains the magnetic bearing fluid 25. Thus, when the magnetic bearing fluid 25 leaks from the reservoir 27, a large surface area of the bearing fluid absorption pad 30 is available to capture and absorb the bearing fluid. As a result, the bearing fluid absorption pad 30 can capture and absorb a substantial amount of magnetic bearing fluid 25 and in conjunction with the sealing plate 28 better prevent the bearing fluid from escaping and contaminating the discs.

Figure 6:
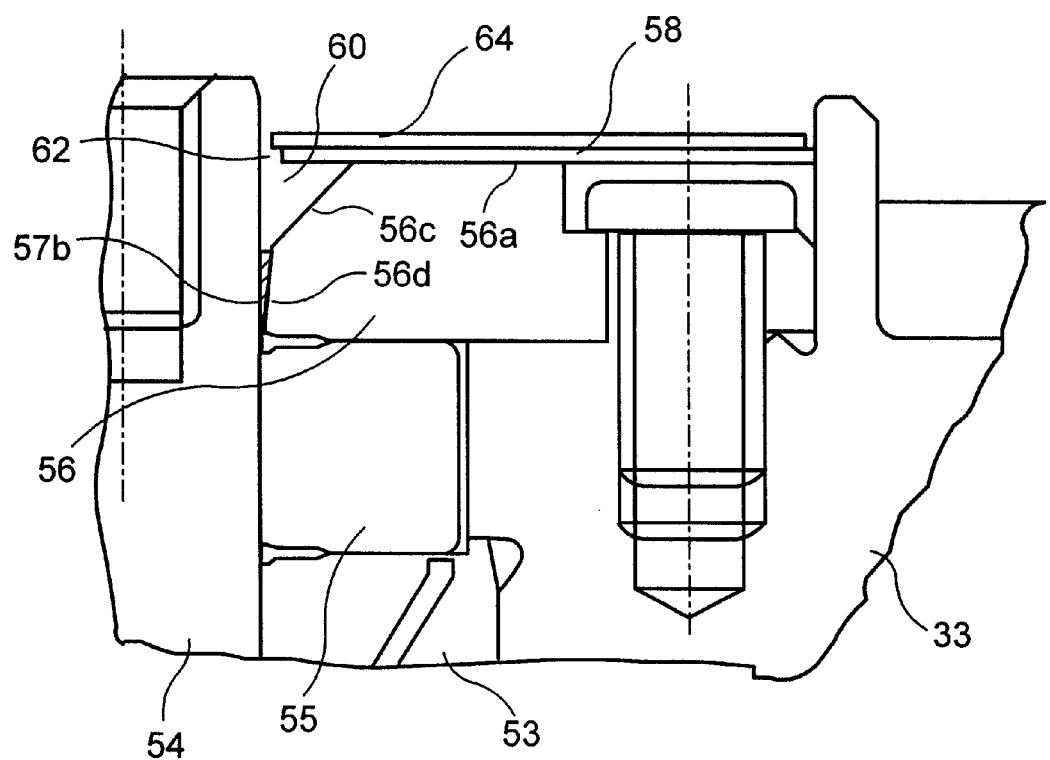

The invention shown in FIG. 4 and described above is applied to a spindle motor. FIGS. 5 and 6 show second and third embodiments which are applied to a journal-type motor.

FIG. 5 is a cross sectional view of a portion of a motor according to a second embodiment of the present invention. Referring to FIG. 5, a journal-type motor is shown which includes a frame 51 with a hollow cylindrical support holder 52. A stator assembly 2 is mounted on an outer periphery of the support holder 52. A rotor assembly 3 includes a hub 33 for supporting one or more discs which are not shown. A drive magnet 35 is attached to an inner periphery of the hub 33 and is positioned to face the stator assembly 2.

The hub 33 is rotatably mounted to a stationary shaft 54 by means of an inner sleeve 53. The inner sleeve 53 is fixed to an inner portion 33c of the hub 33 and includes an annular cavity 51 that separates two radial fluid bearing sections 53a and 53b. The inner sleeve 53 acts as a bearing plate for the hub 33.

A thrust plate 55 is positioned between a lateral surface of the inner portion 33c of the hub 33 and a pressing plate 56. The pressing plate 56 is affixed to the hub 33 by use of a screw 68. The thrust plate 55 includes two axial bearing sections 55a and 55b.

A reservoir 57b is formed between an inclined surface 56d of the pressing plate 56 and the shaft 54. The widest distance between the inclined surface 56d and the shaft is between 0.05 to 0.1 mm. A reservoir 57a is formed at the other end of the fluid bearing between an inclined surface of the inner sleeve 53 and the shaft 54.

A bearing fluid provides the means for rotation between the hub 33 and shaft 54. Bearing fluid is contained in, among other places, reservoirs 57a, 57b, bearing sections 55a, 55b, the annular cavity 51, and bearing sections 53a, 53b.

An axially outer surface of the pressing plate 56 includes three portions—a lateral portion 56a, a ledge portion 56b, and an inclined portion 56c. A bearing fluid absorption pad 58, which is an annular disc, is mounted on the lateral portion 56a of the pressing plate 56. As a result, a capture space 60 is formed between an axially inner lateral surface of the bearing fluid absorption pad 58 and portions 56b and 56c of the pressing plate 56. The capture space 60 directly exposes a substantial portion of the inner lateral surface of the bearing absorption pad 58 to the reservoir 57b.

A sealing plate 64, which is also an annular disc, is positioned axially outward from the bearing fluid absorption pad 58. The sealing plate 64 is mounted to the hub 33. The sealing plate 64 extends beyond the bearing fluid absorption pad 58 in a radial direction toward the shaft 54 such that a capture space 62 is formed beneath the sealing plate 64 and between an end surface of the bearing fluid absorption pad 58 and the shaft 54. The capture space 62 exposes the end surface of the bearing fluid absorption pad 58 to the reservoir 57b.

In one example of the FIG. 5 embodiment, a distance from the end of the sealing plate 64 to the shaft 54 is 0.1 mm, and the distance between the end of the bearing fluid absorption pad 58 and the shaft 54 is between 0.15 to 0.2 mm. Also, the bearing fluid absorption pad 58 has a thickness of 0.48 mm and, the ledge portion 56b of the pressing plate 56 is 0.1 mm from the inner lateral surface of the bearing fluid absorption pad 58.

The embodiment of the invention shown in FIG. 5, like the embodiment of the invention shown in FIG. 4, maximizes the surface area of the bearing fluid absorption pad 58 which is exposed to the reservoir 57b. Thus, when the bearing fluid leak, a large surface area of the bearing fluid absorption pad 58 is available to capture and absorb the bearing fluid.

FIG. 6 shows a third embodiment of the invention which is used with a journal-type motor similar to the one shown in FIG. 5. However, with the third embodiment of the invention, the axially outer surface of the pressing plate 56 does not include a ledge portion 56b. Instead, that surface only includes a lateral portion 56a and an inclined portion 56c. All other aspects of the third embodiment are the same as those described above for the second embodiment.

The inclined portion 56c allows for a capture space 60 to be formed between the pressing plate 56 and a lateral surface of the bearing fluid absorption pad 58. This capture space 60 directly exposes a substantial portion of the bottom surface of the bearing fluid absorption pad 58 to the reservoir 57b. As such, the third embodiment of the invention provides the same benefits and advantages as the second embodiment.

The present invention is not to be considered limited in scope by the embodiments described in the specification. Additional advantages and modifications, which will readily occur to those skilled in the art from consideration of the specification and practice of the invention, are intended to be within the scope and spirit of the following claims.

What is claimed is:

1. A fluid sealing device for use in a motor having fluid bearing for mounting a frame to a shaft, said fluid sealing device comprising:

a bearing fluid reservoir positioned at one axial end of the fluid bearing;

a sealing plate mounted on said frame and positioned axially outward of said fluid reservoir, said sealing plate having an inner edge extending radially toward said shaft to provide a sealing space between said shaft and said sealing plate;

a bearing fluid absorption pad mounted on said frame, said bearing fluid absorption pad being mounted axially inward from said sealing plate, a capture space being provided between said bearing fluid absorption pad, said sealing plate and said reservoir, such that said bearing fluid absorption pad is exposed to said reservoir and bearing fluid leaking from said reservoir is captured and absorbed by said bearing fluid absorption pad wherein said bearing fluid reservoir being formed between the inclined surface of a plate having an inclined surface that is positioned on a ledge formed in one end of said fluid bearing and said shaft.

2. The fluid sealing device of claim 1, wherein a radial inner edge of said bearing fluid absorption pad is exposed to said reservoir to capture and absorb bearing fluid leaking from said reservoir.

3. The fluid sealing device of claim 2, wherein a distance between said radial inner edge of said bearing fluid absorption pad and said shaft is greater than the distance between said inner edge of sealing plate and said shaft.

4. The fluid sealing device of claim 1, wherein a lateral surface of said bearing fluid absorption pad is exposed to said reservoir to capture and absorb bearing fluid leaking from said reservoir.

5. The bearing fluid sealing device of claim 1, wherein:

said sealing plate and said bearing fluid absorption pad are each annual discs; and an axially outer lateral surface of said bearing fluid absorption pad is in contact with a surface of said sealing plate.

6. A fluid sealing device in a motor having an axially deployed bearing fluid bearing between stationary and rotatable elements, said fluid sealing device comprising:

a bearing fluid reservoir position at one axial end of the fluid bearing, a sealing plate mounted axially outward of said fluid reservoir, said sealing plate providing a sealing space between stationary and rotatable elements of said motor, and a fluid absorbing pad mounted axially inward from said sealing plate to provide a capture space between said fluid absorbing pad, said sealing plate and said reservoir, such that said absorbing pad is exposed to said reservoir and fluid lacking from said reservoir is captured and absorbed by said absorbing pad wherein said bearing fluid reservoir being formed between the inclined surface of a plate having an inclined surface that is positioned on a ledge formed in one end of said fluid bearing and said shaft.

7. The fluid sealing device of claim 6 wherein a radial edge of said bearing fluid absorption pad is exposed to said reservoir to capture and absorb bearing fluid leaking from said reservoir.

8. The fluid sealing device of claim 6 wherein a lateral surface of said bearing fluid absorption pad is exposed to said reservoir to capture and absorb bearing fluid leaking from said reservoir.

9. The fluid sealing device of claim 8 wherein said sealing plate has a radial edge and said fluid absorbing pad has a radial edge, said radial edge of said sealing plate extending further than said radial edge of said fluid absorbing pad.

10. The fluid sealing device of claim 6 wherein:

an axially outer lateral surface of said bearing fluid absorption pad is in contact with a surface of said sealing plate.

* * * * *